Feb. 18, 1958     J. J. BALDINE     2,823,393
CUSHION PAD FOR ONE-MAN ARMORED TANK
Original Filed April 2, 1951
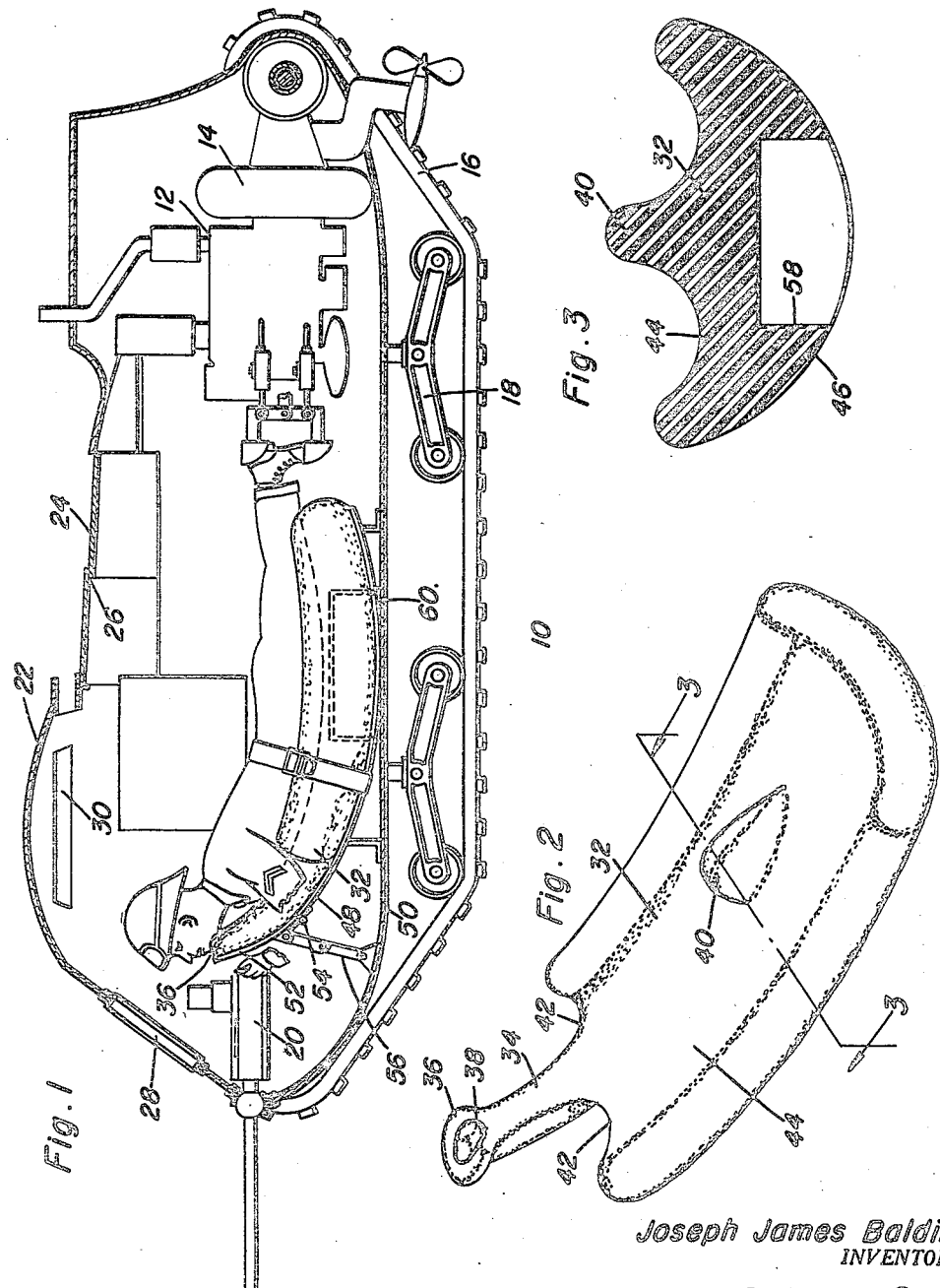
Joseph James Baldine
INVENTOR.

United States Patent Office 2,823,393
Patented Feb. 18, 1958

2,823,393

CUSHION PAD FOR ONE-MAN ARMORED TANK

Joseph James Baldine, Hubbard, Ohio

Original application April 2, 1951, Serial No. 218,764, now Patent No. 2,722,986, dated November 8, 1955. Divided and this application September 19, 1955, Serial No. 534,997

1 Claim. (Cl. 5—344)

The present invention relates to improvements in armored tanks, and more particularly to tanks that can be operated by a single man, and constitutes a divisional application of the subject matter of my prior copending application, Serial No. 218,764, filed April 2, 1951, for One-Man Armored Tank, now Patent No. 2,722,986, issued November 8, 1955.

An object of the present invention is to provide a pad adapted to be positioned within the tank for comfortably supporting the operator in a reclined position for control of the steering mechanism of the tank and the armament provided therefor.

Another object of the present invention is to provide a pad formed with chin and arm rests and a cross-block to maintain the operator in an effective position.

A still further object of the invention resides in the provision of a cushion pad having a generally concave upper surface for receiving and supporting the operator of the tank and to hold the operator in position for more efficient control of the tank even when traveling over comparatively rough terrain.

Still further objects and features of this invention reside in the provision of a one-man armored tank having novel supporting means for the operator thereof that is simple in construction, capable of protecting the operator against the forces exerted by the various accelerations and declerations occurring during normal and unexpected types of operation to which the tank is submitted and which is adapted to provide an increased amount of comfort to the operator while reducing fatigue.

These, together with the various ancillary objects and features of the invention which will become apparent as the following description proceeds, are attained by this cushion pad for a one-man armored tank, a preferred embodiment of which has been illustrated in the accompanying drawings, by way of example only, wherein:

Figure 1 is a longitudinal sectional view of the tank showing an operator positioned on the pad;

Figure 2 is a perspective view of the cushion pad comprising the present invention; and Figure 3 is a sectional detail view of the cushion pad shown in an enlarged scale, as taken on the plane of line 3—3 in Figure 2.

Referring now to the accompanying drawings wherein like reference numerals indicate similar parts throughout the various views, reference numeral 10 generally designates the one-man armored tank having a prime mover 12, a fluid transmission 14, an endless track 16, together with shock absorbing means 18 as well as suitable armament which may be a machine gun 20.

The tank 10 is formed of a shell 22 of preselected thickness armored plate and an entrance hatchway 24 slidably closes the opening 26 at the upper portion of the shell. The forward end of the shell 22 is provided with a bulletproof window 28 and upper ventilation openings 30.

In order to provide a comfortable body support for the operator of the tank, an elongated substantially rectangular pad 32 of arcuate contour and formed of sponge rubber or the like is provided. The pad 32 has a longitudinal extension 34 terminating in an enlarged portion 36 having a chin receiving recess 38 therein. A central portion of the pad 102 has a crotch block 40 integrally formed therewith for positioning between the legs of the operator. The longitudinal side edges of the pad are formed with ridges for maintaining the operator on the pad. The forward edge of the pad 32 is arcuately recessed as at 42 for receiving the arms of the operator.

The upper surface 44 of the pad 32 is concave in configuration while the undersurface 46 is convex in shape. The entire pad is positioned on the arcuately contoured supporting plate 48 which is fixedly positioned on the floor 50 of the tank 10. The forward end 52 of the plate 48 is hingedly attached thereto by means of a hinge 54 and a collapsible support 56 is positioned for selectively supporting the forward ends 42 of the pad, as is desired.

The pad is formed with a rectangular recess 58 in its underside for receiving the gasoline tank 60.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A pad for use in endless track vehicle comprising an elongated rubber-like member arcuate in longitudinal and transverse cross section and having a reduced cross-section extension at one end, said extension terminating in a recessed chin rest, an intermediate portion of said member having a vertically extending projection integrally formed therewith for positioning between the legs of the operator, the upper surface of said pad being concave, said member having longitudinally extending ridges at the sides thereof.

References Cited in the file of this patent

UNITED STATES PATENTS

| | | |
|---|---|---|
| 1,584,694 | Miller | May 11, 1926 |
| 1,764,756 | Slee | June 17, 1930 |
| 2,369,258 | Shebat | Feb. 13, 1945 |
| 2,411,770 | Zimmerman | Nov. 26, 1946 |
| 2,470,398 | Hayes | May 17, 1949 |

OTHER REFERENCES

"Aviation Week" magazine, Nov. 1, 1954, pages 42, 43, 45, 46 (vol. 61, #18).